(12) United States Patent
Seth et al.

(10) Patent No.: US 9,802,846 B2
(45) Date of Patent: Oct. 31, 2017

(54) TREATING AND RECYLCING OILFIELD WASTE WATER

(71) Applicants: Kushal Seth, Houston, TX (US);
Jenifer C. Lascano, Odessa, TX (US);
Larry G. Hines, Odessa, TX (US)

(72) Inventors: Kushal Seth, Houston, TX (US);
Jenifer C. Lascano, Odessa, TX (US);
Larry G. Hines, Odessa, TX (US)

(73) Assignee: BAKER HUGHES, a GE COMPANY, LLC, Houston, TX (US)

( * ) Notice: Subject to any disclaimer, the term of this patent is extended or adjusted under 35 U.S.C. 154(b) by 343 days.

(21) Appl. No.: 13/923,509

(22) Filed: Jun. 21, 2013

(65) Prior Publication Data
US 2014/0374103 A1 Dec. 25, 2014

(51) Int. Cl.
| | | |
|---|---|---|
| C02F 1/76 | (2006.01) | |
| C02F 9/00 | (2006.01) | |
| C02F 1/72 | (2006.01) | |
| C02F 1/50 | (2006.01) | |
| C02F 103/10 | (2006.01) | |

(52) U.S. Cl.
CPC ............... *C02F 1/76* (2013.01); *C02F 9/00* (2013.01); *C02F 1/50* (2013.01); *C02F 1/72* (2013.01); *C02F 1/722* (2013.01); *C02F 2103/10* (2013.01); *C02F 2209/04* (2013.01)

(58) Field of Classification Search
CPC .... C02F 1/722; C02F 1/76; C02F 9/00; C02F 1/50; C09K 8/58; C09K 8/584; C09K 8/607; E21B 43/26; E21B 43/32
See application file for complete search history.

(56) References Cited

U.S. PATENT DOCUMENTS

| | | | |
|---|---|---|---|
| 3,705,098 A | 12/1972 | Shepherd et al. | |
| 4,131,641 A | 12/1978 | Brown | |
| 4,325,936 A | 4/1982 | Gowdy et al. | |
| 4,363,215 A * | 12/1982 | Sharp | B01D 53/00 210/759 |
| 4,552,591 A * | 11/1985 | Millar | A01N 25/12 106/18.33 |
| 5,284,844 A * | 2/1994 | Lorenz | A01N 43/88 514/222.5 |

(Continued)

FOREIGN PATENT DOCUMENTS

| | | | |
|---|---|---|---|
| CA | 2847492 A1 * | 2/2013 | ............. C02F 1/722 |
| CN | 101172726 A | 5/2008 | |

(Continued)

OTHER PUBLICATIONS

Cotrino, "Control of hydrogen sulfide from groundwater using packed-bed anion exchange and other technologies", University of South Florida, Graduate Thesis, Apr. 10, 2006, pp. 68-71.

(Continued)

*Primary Examiner* — Zakiya W Bates
*Assistant Examiner* — Crystal J Miller
(74) *Attorney, Agent, or Firm* — Cantor Colburn LLP

(57) ABSTRACT

A process for treating oilfield waste water includes combining oilfield waste water and a biocide comprising hydrogen peroxide, the biocide being present in an amount effective to decrease a number density of bacteria in the oilfield waste water. The treated water can be reused in a subterranean environment.

17 Claims, 2 Drawing Sheets

(56) References Cited

U.S. PATENT DOCUMENTS

| | | | |
|---|---|---|---|
| 5,505,857 A * | 4/1996 | Misra | C01G 49/009 |
| | | | 210/709 |
| 6,475,373 B1 | 11/2002 | Shimomura et al. | |
| 6,709,592 B2 | 3/2004 | Van Groenestijn et al. | |
| 7,374,682 B2 | 5/2008 | Kamachi | |
| 7,824,557 B2 * | 11/2010 | Whitekettle | A01N 47/44 |
| | | | 210/754 |
| 8,225,856 B2 * | 7/2012 | Kerfoot | C02F 9/00 |
| | | | 166/177.5 |
| 8,318,027 B2 * | 11/2012 | McGuire | C02F 1/004 |
| | | | 210/151 |
| 8,784,659 B2 * | 7/2014 | Whitekettle | A01N 47/44 |
| | | | 210/606 |
| 2007/0074975 A1 * | 4/2007 | Buschmann | C02F 1/4672 |
| | | | 205/466 |
| 2007/0102359 A1 * | 5/2007 | Lombardi | B01D 17/085 |
| | | | 210/639 |
| 2008/0006034 A1 * | 1/2008 | Cerroni | B03B 9/06 |
| | | | 60/780 |
| 2009/0039035 A1 * | 2/2009 | Whitekettle | A01N 47/44 |
| | | | 210/764 |
| 2010/0056404 A1 | 3/2010 | Talley | |
| 2010/0140107 A1 * | 6/2010 | Sloan | C25B 1/26 |
| | | | 205/751 |
| 2010/0300979 A1 * | 12/2010 | Gilmour | E21B 21/066 |
| | | | 210/712 |
| 2011/0000854 A1 * | 1/2011 | Nichols | C02F 1/281 |
| | | | 210/666 |
| 2011/0017677 A1 * | 1/2011 | Evans | C02F 1/5236 |
| | | | 210/708 |
| 2011/0052656 A1 * | 3/2011 | Whitekettle | A01N 47/44 |
| | | | 424/421 |
| 2011/0253634 A1 * | 10/2011 | Soane | C02F 1/28 |
| | | | 210/680 |
| 2012/0080389 A1 | 4/2012 | Smith et al. | |
| 2012/0103919 A1 * | 5/2012 | Haggstrom | C02F 1/72 |
| | | | 210/758 |
| 2012/0220500 A1 | 8/2012 | Matza et al. | |
| 2012/0255904 A1 * | 10/2012 | Nagghappan | E21B 43/34 |
| | | | 210/638 |
| 2012/0267315 A1 | 10/2012 | Soane et al. | |
| 2012/0322696 A1 | 12/2012 | Hayes et al. | |
| 2013/0023448 A1 | 1/2013 | Glasscott et al. | |
| 2015/0013987 A1 | 1/2015 | Underwood et al. | |

FOREIGN PATENT DOCUMENTS

| | | |
|---|---|---|
| EP | 1036498 B1 | 6/2002 |
| WO | 2012136505 A2 | 10/2012 |

OTHER PUBLICATIONS

McVay, "Processes for removal of hydrogen sulfide found in Florida ground water source", Florida Rural Water Association, May 2, 2007, pp. 1-19.

LuminUltra, "Quick Reference Guide Quench-GoneTM Aqueous Test Kit Product #: QGA-25 / QGA-100", © LuminUltra 2012, 10 pages.

Trevor V. Suslow et al., "Oxidation-Reduction Potential (ORP) for Water Disinfection Monitoring, Control, and Documentation", University of California Division of Agriculture and Natural Resources, Publication 8149, 2004, 5 pages.

Date of USP Technologies, "Sulfide Oxidation with Hydrogren Peroxide"; 2 pages.

USP Technologies, "Sulfide Oxidation with Hydrogen Peroxide", Feb. 2001; 3 pages.

* cited by examiner

TREATING AND RECYLCING OILFIELD WASTE WATER

BACKGROUND

Microbes contaminate many industrial processes such as oil or natural gas production operations. The contamination occurs from aerobic and anaerobic bacteria and causes reservoir souring, corrosion of equipment or pipelines, and degradation of additives in oilfield fluids. The microbes grow heartily in the nutrient-rich water present in oilfield environments and operations in both terrestrial and subterranean locations.

Water is used for stimulation of hydrocarbon and natural gas wells as well as in hydraulic fracturing. Recently, hydraulic fracturing has dramatically increased the amount of hydrocarbon production worldwide. Large volumes of water injection coupled with water conservation efforts have increased an emphasis on oilfield water management such as water reuse. However, reuse of oilfield waste water poses a challenge to the industry, and the high level of bacteria present in waste water is a technical obstacle. If the water contains appreciable bacteria, it cannot be reused or its reuse is limited. Attempts to kill the bacteria in waste water include adding compounds such as chlorine and ozone.

The development of processes and systems that can be used to treat water and decrease bacteria in the water is highly desired by the industry.

BRIEF DESCRIPTION

The above and other deficiencies are overcome by, in an embodiment, a process for treating oilfield waste water comprises combining oilfield waste water and a biocide comprising hydrogen peroxide, the biocide being present in an amount effective to decrease a number density of bacteria in the oilfield waste water In an additional embodiment, a process for treating oilfield waste water comprises measuring an oxidation reduction potential (ORP) of oilfield waste water; combining the oilfield waste water and an oxidizer in an amount to adjust the ORP of the oilfield waste water to be greater than or equal to a first ORP value; and adding a biocide comprising hydrogen peroxide to the oilfield waste water to adjust the ORP of the oilfield waste water to be greater than or equal to a second ORP value, to treat the oilfield waste water, the second ORP value being greater than the first ORP value.

In a further embodiment, a process for recycling oilfield waste water comprises combining oilfield waste water and a biocide comprising hydrogen peroxide; decreasing a number density of bacteria in the oilfield waste water to form treated water; introducing an additive to the treated water; and disposing the treated water in a subterranean environment.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
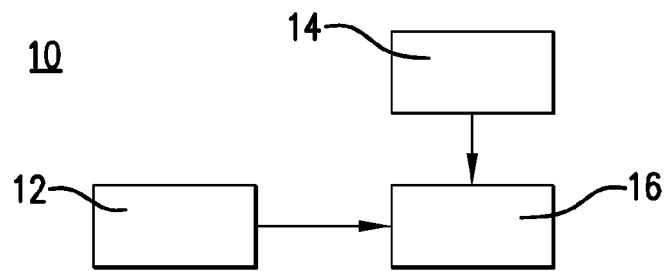
FIG. 1 shows a diagram of a batch treatment system for oilfield waste water.

A detailed description of one or more embodiments is presented herein by way of exemplification and not limitation.

A low-cost, green chemical biocide reduces or eliminates bacteria in oilfield waste water. The biocide renders the water storable, disposable, or re-useable as an oilfield fluid. The biocide herein is a green chemical that exerts no negative footprint or impact on the environment and efficiently kills bacteria in the oilfield waste water.

Oilfield fluids are subject to bacterial degradation. In fracturing fluids, bacteria consume or interfere with fracture fluid base components that are needed to fulfill the objective of the fracturing fluid. Chemical biocides and radiation have been proposed to overcome the detrimental impact of bacteria on these fluids. Since bacteria actively consume certain fluid additives, successful bacterial control lowers the cost of hydraulic fracturing by reducing the amounts of additives such as a polysaccharide or guar, which are added to the fluid to impart properties (e.g., viscosity stabilization) to the fluid. Hydrogen peroxide is disclosed herein as a potent biocide that advantageously is a green, commodity chemical whose decomposition products are not toxic to humans.

In an embodiment, a process for treating oilfield waste water includes combining oilfield waste water and a biocide comprising hydrogen peroxide. The biocide is present in the oilfield waste water in an amount effective to decrease a number density of bacteria in the oilfield waste water.

In some embodiments, the oilfield waste water is a product of injecting water downhole or is formation water that flows from the formation to the surface. Exemplary oilfield waste water includes produced water, flowback water, settling pond water, water-flooding fluid, reserve pit water, or various recovered fluids such as drilling fluid, drilling mud, completion fluid, work over fluid, packer fluid, stimulation fluid, conformance control fluid, permeability control fluid, consolidation fluid, or a combination comprising at least one of the foregoing. Recovered fluids such as drilling fluid refer to any type of fluid pumped into a subterranean environment (e.g., a downhole, a borehole, a formation, and the like) during drilling, production, maintenance, or a restoration process. In some embodiments, the drilling fluid is treated water made by combining the biocide and the oilfield waste water and contains or does not contain additives. Produced water typically is water that flows to the surface during production of oil and gas from a subterranean hydrocarbon source. Flowback water, on the other hand, generally is water that flows to the surface after performing a hydraulic fracturing job. The oilfield waste water (e.g., produced water or flowback water) contains a plurality of neutral and ionic species that include the elements aluminum, antimony, arsenic, barium, boron, cadmium, calcium, carbon, chlorine, chromium, cobalt, copper, gallium, germanium, hafnium, indium, iron, lanthanum, lead, magnesium, manganese, mercury, molybdenum, nickel, niobium, potassium, phosphorus, radium, selenium, silicon, silver, sodium, strontium, sulfur, tantalum, tellurium, thallium, tin, titanium, tungsten, vanadium, zinc, zirconium, or a combination thereof. In an embodiment, these elements are present as an ionic species that are hydrated, complexed, combined with another species, or a combination thereof. In some embodiments, the oilfield waste water also includes polyatomic species such as $SO_4^{2-}$, $HCO_3^-$, $CO_3^{2-}$, $H_2S$, and the like as well as other components, including oil, grease, and dissolved solids. The concentration of these species changes from one source to another source and also varies in time, even from the same source (e.g., the same well).

As indicated above, the biocide comprises hydrogen peroxide. Besides the hydrogen peroxide, a secondary biocide is introduced into the oilfield waste water in some embodiments. According to an embodiment, the biocide or secondary biocide does not interfere with the other components of the treated water formed by treating the oilfield waste water and is not a health risk. In an embodiment, the secondary biocide is an aldehyde such as glutaraldehyde, o-phthalalonyl, formaldehyde, and the like. Examples of the secondary biocide include non-oxidizing and oxidizing secondary biocides. Exemplary oxidizing secondary biocides include hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, tris hydroxymethyl phosphine, trichloroisocyanuric acids, dichloroisocyanuric acids, 1-(3-chloroallyl)-3,5,7,-triaza-1-azonia-adamantane chloride, 1,2-benzisothiazolin-3-one, chlorinated hydantoins, and the like. Additional oxidizing secondary biocides include, e.g., bromine products such as: sodium hypobromite, ammonium bromide, sodium bromide, or brominated hydantoins such as 1-bromo-3-chloro-5,5-dimethylhydantoin. Other oxidizing secondary biocides include chlorine, chlorine dioxide, chloramine, ozone, inorganic persulfates such as ammonium persulfate, or peroxides, such as hydrogen peroxide and organic peroxides.

Exemplary non-oxidizing secondary biocides include dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl)phosphonium sulfate, glutaraldehyde, alkyldimethylbenzyl ammonium chloride, didecyldimethylammonium chloride, 2,2-dibromo-3-nitrilopropionamide, poly[oxyethylene-(dimethyliminio)ethylene(dimethyliminio)ethylene dichloride], decylthioethanamine, terbuthylazine, and the like. Additional non-oxidizing secondary biocides are quaternary ammonium salts, aldehydes, and quaternary phosphonium salts. In an embodiment, quaternary biocides have a fatty alkyl group and three methyl groups, but in the phosphonium salts, the methyl groups, e.g., are substituted by hydroxymethyl groups without substantially affecting the biocidal activity. In an embodiment, they also are substituted with an aryl group. Further examples of the secondary biocide includes glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, 2,6-dimethyl-m-dioxan-4-ol acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azonia-adamantane, 5-chloro-2-methyl-4-isothiazolin-3-one, 2-methyl-4-isothiazolin-3-one, 2-methyl-4-isothiazolin-3-one, tris(hydroxmethyl)nitromethane, or a combination thereof.

Additional exemplary secondary biocides include triazines such as 1,3,5-tris-(2-hydroxyethyl)-s-triazine and trimethyl-1,3,5-triazine-1,3,5-triethanol, iodopropynylbutylcarbamate, 4,4-dimethyloxazolidine, 7-ethyl bicyclooxazolidine, 4-(2-nitrobutyl)-morpholine, 4,4'-(2-ethyl-2-nitrotrimethylene)dimorpholine, octylisothiazolinone, dichloro-octylisothiazolinone, dibromo-octylisothiazolinone, phenolics (e.g., o-phenylphenol, p-chloro-m-cresol, their corresponding alkali metal salt, and the like), sodium pyrithione, zinc pyrithione, n-butyl benzisothiazolinone, 1-(3-chloroallyl)-3,5,7-triaza-1-azoniaadamantane chloride, chlorothalonil, carbendazim, diiodomethyltolylsulfone, N,N'-methylene-bis-morpholine, ethylenedioxy methanol, phenoxyethanol, tetramethylol acetylenediurea, dithiocarbamates, 2,6-dimethyl-m-dioxan-4-ol acetate, dimethyloldimethyl-hydantoin, bicyclic oxazolidines, (thiocyanomethylthio)-benzothiazole, and the like.

Further exemplary secondary biocides are 3-allyloxy-1,2-benzoisothiazol-1,1-dioxide; methyl-N-(1H-benzoimidazol-2-yl)carbamate; 2-(tert-butylamino)-4-(cyclopropylamino)-6-(methylthio)-striazine; 2-tert-butylamino-4-ethylamino-6-methylmercapto-s-triazine; 2-chloro-1-(3-ethoxy-4-nitrophenoxy)-4(trifluoromethyl)benzene; 4-chlorophenoxy-3,3-dimethyl-1-(1H, 1,3,4-triazol-1-yl)-2-butanone; α-[2-(4-chlorophenyl)ethyl]-α-(1,1-dimethylethyl)-1H-1,2,4-triazole-1-ethanol; copper 8-quinolinate; cycloheximide; bis-(dimethyldithiocarbamoyl)disulfide; 1,4-dichloro-2,5-dimethoxybenzene; N'-dichlorofluoromethylthio-N,N-dimethyl-N-phenyl sulfamide; 2,3-dichloro-1,4-naphthoquinone; 2,6-dichloro-4-nitroaniline; 4,5-dichloro-2-N-octyl-4-isothiazolin-3-one; N-(3,5-dichlorophenyl)-1,2-dimethylcyclopropane-1,2-dicarboxylmide; N'-(3,4-dichlorophenyl)-N,N-dimethylurea; 1-[2-(2,4-dichlorophenyl)-4-ethyl-1,3-dioxorane-2-yl-methyl]-1H,1,2,4-triazol; N-(3,5-dichlorophenyl)succinamide; 1-[[2(2,4-dichlorophenyl)-4-propyl-1,3-dioxolan-2-yl]methyl]1-H-1,2,4-triazole; N-2,3-dichlorophenyltetrachlorophthalamic acid; 3-(3,5-dichlorophenyl)-5-ethenyl-5-methyloxazolizine-2,4-dione; 2,3-dicyano-1,4-dithioanthraquinone; N-(2,6-diethylphenyl)-4-methylphthalimide; N-(2,6-p-diethylphenyl)phthalimide; 5,6-dihydro-2-methyl-1,4-oxathine-3-carboxanilide; 5,6-dihydro-2-methyl-1,4-oxathine-3-carboxanilide-4,4-dioxide; diisopropyl 1,3-dithiolane-2-iridene malonate; N,N-diisoprapyl S-benzylphosphorothioate; 2-dimethylamino-4-methyl-5-N-butyl-6hydroxypyrimidine; diethyl 2-dimethoxyphosphinothioylsulfanylbutanedioate; bis(dimethyldithiocarbamoyl)ethylenediamine; 5-ethoxy-3-trichloromethyl-1,2,4-thiaziazole; ethyl-N-(3-dimethylaminopropyl)thiocarbamate hydrochloride; 3,3'-ethylene-bis-(tetrahydro-4,6-dimethyl-2H-1,3,5-thiadiazine-2thione); 3-hydroxy-5-methylisooxazole; 3-iodo-2-propargyl butyl carbamate; iron methanearsonate; 3'-isopropoxy-2-methylbenzanilide; 1-isopropylcarbamoyl-3-(3,5-dichlorophenyl)hydantoin; manganese ethylene-bis-(dithiocarbamate); 1,2-bis-(3-methoxycarbonyl-2-thioureido)benzene; methyl-1 (butylcarbamoyl)-2-benzimidazolecarbamate; 3-methyl-4-chlorobenzthiazol-2-one; nickel dimethyldithiocarbamate; 2-octyl-2H-isothiazol-3-one; 2-oxy-3-chloro-1,4-naphthoquinone copper sulfate; pentachloronitrobenzene; potassium N-hydroxymethyl-N-methyldithiocarbamate; N-propyl-N-[2-(2,4,6-trichlorophenoxy)ethyl]imidazol-1-carboxamide; 2-pyridinethiol-1-oxide sodium salt; sodium pyrithione;

N-tetrachloroethylthio-4-cyclohexene-1,2-dicarboxylmide; tetrachloroisophthalonitrile; 4,5,6,7-tetrachlorophthalide; 2-(thiocyanomethylthio)benzothiazole; N-trichloromethylthio 4-cyclohexene-1,2-dicarboxylmide; N-(trichloromethylthio)phthalimide; validamycin; zinc ethylene-bis-(dithiocarbamate); zinc bis-(1-hydroxy-2(1H)pyridinethionate; zinc propylene-bis-(dithiocarbamate); zinc pyrithione, and the like. A combination of any of the foregoing secondary biocides is useful together as long as the combination does not negatively affect reuse of the treated water or render the biocide inactive or substantially inactive with respect to reducing or eliminating the bacteria in the oilfield waste water.

In one embodiment, the oilfield waste water is irradiated with, e.g., an ultraviolet, a visible, or an infrared wavelength, which further eliminates bacteria in the oilfield waste water. According to an embodiment, the oilfield waste water is heated to decrease the number density of bacteria therein. Irradiating or heating the oilfield waste water occurs synchronously or asynchronously combining the oilfield waste water with the biocide. In the asynchronous case, irradiating or heating the oilfield waste water occurs before or after combining the oilfield waste water with the biocide.

In an embodiment, the oilfield waste water contains various forms of bacteria including those found in petroleum reservoirs, sulfate-reducing bacteria, acid-forming bacteria, slime-forming bacteria, iron-oxidizing bacteria, sulfide oxidizing bacteria, general heterotrophic bacteria, sulfate-reducing archaea, nitrate-reducing bacteria, or a combination comprising at least one of the foregoing. The oilfield waste water is subject to an anaerobic or an aerobic condition and contains nutrients such as an organic compound, a sulfide, or a metal. Under certain conditions, the aerobic bacteria and anaerobic bacteria are present together in the oilfield waste water, depending on the amount of oxygen in the oilfield waste water.

In some embodiments, the oxidizer is added to the oilfield waste water. The oxidizer oxidizes inorganic material (e.g., sulfide) or organic material (e.g., hydrocarbons) in the oilfield waste water. In an embodiment, the oxidizer includes, for example, an inorganic or organic compound such as a halogen oxidizer (e.g., chlorine dioxide, chlorine gas, sodium hypochlorite, hypobromous acids, chlorates such as $KClO_3$, and the like), an oxygen oxidizer (e.g., peroxy acids, ozone, oxygen, permanganate, and the like), a peroxide (e.g., hydrogen peroxide, calcium peroxide, magnesium peroxide, ketone peroxides, diacyl peroxides, diakyl peroxides, peroxyesters, peroxyketals, hydroperoxides, peroxydicarbonates, and peroxymonocarbonates, and the like), a nitrate (e.g., $R(NO_3)_x$), a nitrite (e.g., $RNO_2$), a dichromate (e.g., potassium dichromate), or a combination comprising at least one of the foregoing. Exemplary oxidizers also include peroxydisulfate salts, persulfate salts, acetylacetone peroxide, methylethylketone peroxide, cyclohexanone peroxide, methylisobutylketone peroxide; benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; tert-butyl peroxide-2-ethyl hexanoate; 1,1-ditert-butylperoxy-3,3,5-trimethyl cyclohexane, 1,3-bis(tert-butylperoxyisopropyl)benzene, and the like.

In some embodiments, the oxidizer is a nitrogen-chloro oxidizer that contains a nitrogen-chlorine bond that is readily released in the oilfield waste water. Exemplary nitrogen-chloro oxidizers are inorganic and organic chloramines ($R_2NCl$, wherein R is independently hydrogen, alkyl, alkylene, and the like) and chlorinated triazine or a derivative thereof that oxidizes sulfide to water soluble sulfate. Such compounds include, e.g., chlorinated oxytriazines, hydroxytriazines, melamines, guanamines, halotriazines, haloalkyltriazines, cyaphenine, and the like. An exemplary compound is trichloro-s-triazinetrione.

According to an embodiment, a coagulant or flocculant is added to clarify the oilfield waste water such as after oxidation or after addition of the biocide. The coagulant is nonionic, cationic, anionic, or zwitterionic. Likewise, the flocculant is nonionic, cationic, anionic, or zwitterionic. In an embodiment, the coagulant or flocculant is selected based on an amount of shear force that occurs in the oilfield waste water, specifically, the coagulant is added when an appreciable shear is applied to oilfield waste water such as with active mixing (e.g., blending, stirring, swirling, spraying, and the like) whereas the flocculant is added to the oilfield waste water under a condition of low applied shear to the oilfield waste water. According to an embodiment, the coagulant and flocculant are disposed in the oilfield waste water separately or together.

In some embodiments, the oilfield waste water before or after being combined with the biocide includes a precipitate or dispersed particles (e.g., a sulfate precipitate, silica, silicates, asphaltene, and the like). The precipitate or dispersed particles are contacted by a flocculant, coagulant, or a combination thereof to form an aggregate. The flocculant or coagulant is added to the oilfield waste water before, after, or during addition of the biocide. Furthermore, the flocculant and coagulant are introduced in the oilfield waste water coincidentally or asynchronously. Without wishing to be bound by theory, it is believed that the flocculant or coagulant accumulates a plurality of precipitate particles to form a large mass of insoluble material with respect to the oilfield waste water. In an embodiment, the flocculant bridges precipitate particles, resulting in more efficient settling.

The coagulant is an inorganic salt (e.g., sodium chloride, aluminum sulfate, polyaluminum chloride, ferric sulfate, ferric chloride, aluminum chloride, sodium aluminate, and the like), organic polymer (e.g., polyethyleneimine, dimethylamine-epichlorohydrin copolymer, dicyandiamide-formaldehyde condensation product, cation-modified starch, and the like), tannin, a melamine formaldehyde, a resin amine, or a combination comprising at least one of the foregoing.

The flocculant is a cationic flocculant, a non-ionic flocculant, or an anionic flocculant. Additionally, the flocculant is present as an emulsion, a dispersion, a brine dispersion, and the like. In an embodiment, the flocculant is an emulsion, which includes a copolymer of acrylamide (ACM) and acrylic acid (AA), a copolymer of acrylamide (ACM) and dimethylaminoethyl acrylate (ADAME), N,N-dimethylaminoethyl acrylate methyl chloride quaternary (AETAC, also referred to as Q9), cationic polyacrylamide (EPAM), acrylic acid (AA), ACM, acrylamide (AM), meth acrylic acid (MA), and the like.

According to an embodiment, a cationic polymeric coagulant or flocculant is a polyethylene imine or polyamine (which is or is not fully quaternised), a dicyandiamide condensation polymer (which is substantially fully quaternised or in salt form), a polymer of water soluble ethylenically unsaturated monomer or monomer blend that is formed from 50 mole percent (mol %) to 100 mol % cationic monomer and from 0 mol % to 50 mol % of another monomer. Ethylenically unsaturated cationic monomers include dialkylaminoalkyl(meth)-acrylates and dialkylaminoalkyl(meth)-acrylamides (usually in quaternary or salt form), diallyl dialkyl ammonium chloride (e.g., diallyl dimethyl ammonium chloride (DADMAC), and the like. Cationic homopolymers or copolymers are useful. In an embodiment, the polymer is a copolymer, and the comonomer is acrylamide or another water soluble non-ionic ethylenically unsaturated monomer.

According to an embodiment, the cationic polymeric coagulant is a linear polymer. Alternatively, it is prepared from multifunctional monomers or additives that produce a branched structure in the polymer backbone, for instance polyethylenically unsaturated monomers such as tetraallyl ammonium chloride, methylene bis acrylamide, and the like.

Nonionic coagulants or flocculants are prepared from nonionic monomers such as acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol)monomethyl ether mono(meth)acrylate, N-vinyl-2-pyrrolidone, glycerol mono((meth)acrylate), 2-hydroxyethyl(meth)acrylate, vinyl methylsulfone, vinyl acetate, and the like.

Zwitterionic coagulants or flocculants are prepared from monomers containing cationic and anionic functionality in equal charge proportions so that the zwitterionic polymer is net neutral. Exemplary zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl)ammonium betaine, and the like.

In an embodiment, the flocculant or coagulant is anionic and is an anionic polymer that includes repeat units that are anionic, cationic, neutral, or a combination thereof as long as the polymer has a net negative charge. The repeat units are branched or linear. In an embodiment, the anionic polymer includes repeat units having various anionic functional groups (e.g., carboxylic acid, sulfonic acid, phosphoric acid, or a phosphonic acid functional group, specifically carboxylic acid radicals) alone or together with further polar radicals such as carboxamide radicals. Anionic copolymer flocculants or coagulants are obtained by copolymerizing an ethylenically unsaturated monomer having an anionic or anionizable side group (e.g., acrylic, methacrylic, vinylsulfonic, vinylphosphonic, itaconic and 2-acrylamidomethylpropanesulfonic acid, sulfopropyl acrylate, and sulfopropyl methacrylate) with a nonionic comonomer (e.g., acrylamide, methacrylamide, N-vinylformamide, N-vinylacetamide, N-vinylmethylacetamide, N-vinylmethylformamide, vinyl acetate, vinylpyrrolidone, and the like). Further, anionic functional groups are introduced into the polymer by esterifying carboxyl groups with a polyol, such as ethanediol, and subjecting the remaining free hydroxyl groups to further reaction with, for example, sulfuric acid or phosphoric acid. In an embodiment, the anionic polymer includes acrylamide and acrylic acid prepared by polymerization of acrylamide and acrylic acid or through hydrolysis of polyacrylamide, e.g., partially hydrolyzed polyacrylamide.

Exemplary monomer units that are polymerized to form the anionic polymer are acrylamide, (meth)acrylamide, 2-acrylamido-2-methylpropane sulphonic acid, acrylamido propyltrimethyl ammonium chloride, acrylic acid, acrylic acid esters, dimethydiallylammonium chloride, dimethylaminoethyl acrylate, dimethylaminoethyl methacrylate, isopropyl acrylamide, polyethylene glycol methacrylate, itaconic acid, methacrylamido propyltrimethyl ammonium chloride, methacrylic acid, methacrylic acid esters, N-vinyl acetamide, N-vinyl formamide N-vinyl pyrrolidone, N-vinylimidazole, N-vinylpyridine, vinyl sulfonic acid, N,N-dimethylacrylamide, tert-butyl acrylamide, poly(ethylene glycol) methyl ether acrylate, poly(propylene glycol) methyl ether acrylate, poly(ethylene glycol) acrylate, undecanoic acid, lauryl acrylate, (3-acrylamidopropyl)trimethylammonium chloride, N-(hydroxymethyl)acrylamide, N-(hydroxyethyl)acrylamide, 2-acrylamidoglycolic acid, 3-acryloylamino-1-propanol, N-(isobutoxymethyl)acrylamide, N-[tris(hydroxymethyl)methyl]acrylamide, N-phenylacrylamide, 2-(diethylamino)ethyl acrylate, 2-ethylhexyl acrylate, 2-hydroxyethyl acrylate, 3-(dimethylamino)propyl acrylate, 4-hydroxybutyl acrylate, di(ethylene glycol) 2-ethylhexyl ether acrylate, [2-(acryloyloxy)ethyl]trimethylammonium chloride, sodium acrylate, 2-(diethylamino)ethyl methacrylate, 2-(dimethylamino)ethyl methacrylate, 2-butoxyethyl methacrylate, 3-(acryloyloxy)-2-hydroxypropyl methacrylate, and the like. In a particular embodiment, the anionic polymer is made by copolymerizing (meth)acrylamide and (meth)acrylic acid.

Examples of anionic polymers include polyacrylic acid, polyacrylates, poly((meth)acrylates), acrylamide/sodium acrylate copolymers, acrylamide/sodium(meth)acrylate copolymers, acrylamide/acrylamidomethyl propone sulfonic acid copolymers, terpolymers of acrylamide/acrylamidomethyl propone sulfonic acid/sodium acrylate, and the like. According to an embodiment, the anionic polymer is a copolymer comprising acrylamide and acrylic acid (or an acrylate salt). In an embodiment, the flocculant is a copolymer that includes acrylamide and acrylate repeat units. Such a flocculant copolymer is available under the trade name Spectrafloc 875 from Baker Hughes Inc. or the trade name Tramfloc 100-199 from Tramfloc Inc.

According to an embodiment, the acrylamide and acrylic acid are present in the anionic polymer in any relative amount. In some embodiments, the acrylamide is present in an amount from 5% to 95% and acrylic acid in an amount from 5% to 95%, based on the total moles of repeat units in the anionic polymer. A ratio of the anionic repeat units to nonionic and cationic repeat units in the anionic copolymer is greater than or equal to 0.1, specifically greater than or equal to 1, more specifically greater than or equal to 10, even more specifically greater than or equal to 100, yet more specifically greater than or equal to 1,000, and further specifically greater than or equal to 10,000, provided that the net charge of the anionic polymer is negative.

In an embodiment, an additive is added to the oilfield waste water after the oilfield waste water is combined with the biocide to form treated water, which is useful as a hydraulic fracturing fluid or in enhanced oil production methods. The additive includes an acid (e.g., a mineral acid or organic acid), the biocide, the secondary biocide, a polymer, a breaker, a clay stabilizer, a corrosion inhibitor, a crosslinker, a friction reducer, a gelling agent, an iron control agent, a lubricant, a non-emulsifier, a pH-adjusting agent, a scale inhibitor, a surfactant, a proppant, or a combination comprising at least one of the foregoing. Such additives are thought to, for example, facilitate entry into rock formations, mitigate production or kill bacteria, reduce the risk of fouling, stabilize clay, provide well maintenance, facilitate proppant entry, improve surface pressure, provide proppant placement, prevent precipitation, reduce fluid tension of the composition, and the like.

Useful surfactants include fatty acids of up to 22 carbon atoms such as stearic acids and esters and polyesters thereof, poly(alkylene glycols) such as poly(ethylene oxide), poly(propylene oxide), and block and random poly(ethylene oxide-propylene oxide) copolymers such as those marketed under the trademark PLURONIC by BASF. Other surfactants include polysiloxanes, such as homopolymers or copolymers of poly(dimethylsiloxane), including those having functionalized end groups, and the like. Other useful surfactants include those having a polymeric dispersant having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. Additionally, the surfactant is anionic, cationic, zwitterionic, or non-ionic.

Exemplary cationic surfactants include but are not limited to alkyl primary, secondary, and tertiary amines, alkanolamides, quaternary ammonium salts, alkylated imidazolium, and pyridinium salts. Additional examples of the cationic surfactant include primary to tertiary alkylamine salts such as, e.g., monostearylammonium chloride, distearylammonium chloride, tristearylammonium chloride; quaternary alkylammonium salts such as, e.g., monostearyltrimethylammonium chloride, distearyldimethylammonium chloride, stearyldimethylbenzylammonium chloride, monostearyl-bis(polyethoxy)methylammonium chloride; alkylpyridinium salts such as, e.g., N-cetylpyridinium chloride, N-stearylpyridinium chloride; N,N-dialkylmorpholinium salts; fatty acid amide salts such as, e.g., polyethylene polyamine; and the like.

Exemplary anionic surfactants include alkyl sulfates, alkyl sulfonates, fatty acids, sulfosuccinates, and phosphates. Examples of an anionic surfactant include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

In an embodiment, the nonionic surfactant is, e.g., an ethoxylated fatty alcohols, alkyl phenol polyethoxylates, fatty acid esters, glycerol esters, glycol esters, polyethers, alkyl polyglycosides, amineoxides, or a combination thereof. Exemplary nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol monononyl ethers); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); block copolymers of polyethylene glycol and polypropylene glycol (e.g., poloxamers available under the trade name Pluronics, available from BASF); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, e.g., betaines, such as alkyl ammonium carboxylates (e.g., $[(CH_3)_3N^+—CH(R)COO^-]$ or sulfonates (sulfo-betaines) such as $[RN^+(CH_3)_2(CH_2)_3SO_3{}^-]$, where R is an alkyl group). Examples include n-dodecyl-N-benzyl-N-methylglycine $[C_{12}H_{25}N^+(CH_2C_5H_5)(CH_3)CH_2COO^-]$ and N-allyl N-benzyl N-methyltaurines $[C_nH_{2n+1}N^+(CH_2C_6H_5)(CH_3)CH_2CH_2SO_3{}^-]$.

In an embodiment, the non-emulsifier of the additive is a combination of the above surfactants or a combination of surfactant with a short chain alcohol or polyol such as lauryl sulfate with isopropanol or ethylene glycol. The non-emulsifier prevents formation of emulsions in the treated water, e.g., hydraulic fracturing fluid.

In an embodiment, the additive is the lubricant such as a polyacrylamide, petroleum distillate, hydrotreated light petroleum distillate, a short chain alcohol (e.g., methanol), or polyol (e.g., ethylene glycol). Such lubricants minimize friction and also include, e.g., a polymer such as polyacrylamide, polyisobutyl methacrylate, polymethyl methacrylate, or polyisobutylene as well as water-soluble lubricants such as guar, guar derivatives, polyacrylamide, and polyethylene oxide.

The clay stabilizer of the additive prevents the clay downhole from swelling under contact with the treated water (e.g., hydraulic fracturing fluid) or applied fracturing pressure. In an embodiment, the clay stabilizer includes a quaternary amine, a brine (e.g., KCl brine), choline chloride, tetramethyl ammonium chloride, and the like.

According to an embodiment, the additive is the pH-adjusting agent, which adjusts the pH of the treated water. The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15 of the periodic table; carbonate salt; bicarbonate salt; or a combination thereof. Exemplary inorganic acids include hydrochloric acid, hydrobromic acid, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination thereof. In an embodiment, the pH-adjusting agent is selected to impart favorable characteristics to the treated water, particularly the hydraulic fracturing fluid. In an embodiment, the pH-adjusting agent is selected to avoid damage to surface equipment or to avoid damage to the wellbore or subterranean formation.

In an embodiment, the additive is the biocide or the secondary biocide that prevents injection of the bacteria downhole. The biocide or secondary biocide kills, eliminates, or reduces the amount of the bacteria in the treated water including additional added water (e.g., river water or pit water added to the treated water). In this way, introduction of bacteria into the formation is prevented as well as mitigating future bacterial reproduction, thus reducing damage downhole or interfering with quality of hydrocarbons from the formation, e.g., by suppressing production of sour gas.

In an embodiment, the biocide or the secondary biocide is encapsulated or coated by any suitable encapsulation method using any suitable encapsulation material, e.g., as discussed herein. The encapsulation material is any material that does not adversely interact or chemically react with the biocide or secondary biocide to destroy its utility. In an embodiment, the biocide or secondary biocide is released from the coating at a selected time.

In an embodiment, the additive is hydrochloric acid, glutaraldehyde, 2,2-dibromo-3-nitrilopropionamide, peroxodisulfates, salt (for example, tetramethylammonium chloride), methanol, potassium hydroxide, sodium acrylate, polyacrylamide, guar gum, citric acid, thioglycolic acid, ethylene glycol, polyacrylate, isopropanol, or a combination thereof.

According to an embodiment, the additive is a breaker such as a peroxide, a persulfate, a perphosphate, a perborate, a percarbonate, a persilicate, an oxyacid of a halogen, an oxyanion of halogen, a peracid, a derivative thereof, or a combination thereof. In some embodiments, the oxidizer and the breaker are the same or different.

In one embodiment, the breaker is a persulfate, such as sodium persulfate, ammonium persulfate, potassium persulfate, potassium peroxymonosulfate (Caro's acid), or a combination thereof. The breaker is, e.g., an oxyacid or oxyanion of halogen, for instance, hypochlorous acid, a hypochlorite, chlorous acid and chlorites, chloric acid and chlorates, perchloric acid and perchlorate, a derivative thereof, or a combination thereof.

In an embodiment, a peroxide breaker has oxygen-oxygen single bonds in its molecular structure. The peroxide breaker is hydrogen peroxide or another material to provide peroxide or hydrogen peroxide so that the breaker has a breaking function, such as changing fluid viscosity. Metal peroxides such as sodium peroxide, calcium peroxide, zinc peroxide, magnesium peroxide, or other peroxides such as superoxides, organic peroxides, and the like can be used.

Additionally, in an embodiment, the peroxide breaker is a stabilized peroxide breaker with the hydrogen peroxide bound, inhibited, or the like by another compound or molecule prior to contact with, e.g., an aqueous fluid such as water such that it forms or releases hydrogen peroxide when contacted by the oilfield waste water or treated water. Exemplary stabilized peroxide breakers include an adduct of hydrogen peroxide with another molecule and include carbamide peroxide or urea peroxide $(C(=O)(NH2)_2.H_2O_2)$, a percarbonate (e.g., sodium percarbonate $(2Na_2CO_3.3H_2O_2)$, potassium percarbonate, ammonium percarbonate, and the like), and the like. The stabilized peroxide breakers also include compounds that undergo hydrolysis in water to release hydrogen peroxide, e.g., sodium perborate. In an embodiment, hydrogen peroxide stabilized with appropriate surfactants also is used as the stabilized peroxide breaker.

According to an embodiment, the breaker is the peracid, e.g., peracetic acid, perbenzoic acid, a derivative thereof, or a combination thereof. Additionally, a variety of peroxycarboxylic acids is employed as the peracid breaker. The peroxycarboxylic acid includes an ester peroxycarboxylic acid, an alkyl ester peroxycarboxylic acid, a sulfoperoxycarboxylic acid, or a combination thereof. Peroxycarboxylic acid (or percarboxylic acid) are acids having a general formula $R(CO_3H)_n$. In an embodiment, the R group is saturated or unsaturated as well as substituted or unsubstituted. As described herein, R is an alkyl, alkenyl, arylalkyl, arylalkenyl, cycloalkyl, cycloalkenyl, aromatic, heterocyclic, or ester group, or a combination thereof (e.g., an alkyl ester group), with n being 1, 2, or 3. Exemplary ester groups include aliphatic ester groups, such as $R^1OC(O)R^2$, where $R^1$ and $R^2$ independently are a group (e.g., an alkyl group) described above for R such that $R^1$ and $R^2$ are, e.g., independently small carbon chain alkyl groups, such as a $C_1$-$C_5$ alkyl group.

One skilled in the art will appreciate that peroxycarboxylic acids are often less stable than carboxylic acids, and their stability increases with increasing molecular weight. Thermal decomposition of the peracids proceeds by, e.g., free radical and nonradical paths, by photodecomposition or radical-induced decomposition, or by the action of metal ions or complexes. In an embodiment, the percarboxylic acid peracids are made by direct, acid catalyzed equilibrium action of hydrogen peroxide with a carboxylic acid, by autoxidation of aldehydes, or from acid chlorides, and hydrides, or carboxylic anhydrides with hydrogen or sodium peroxide.

Exemplary peroxycarboxylic acids include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxycitric, peroxymaleic, peroxyascorbic, peroxyhydroxyacetic (peroxyglycolic), peroxyoxalic, peroxymalonic, peroxysuccinic, peroxyglutaric, peroxyadipic, peroxypimelic, peroxysuberic, peroxysebacic acid, and the like.

In an embodiment, the peracid includes a combination of several peroxycarboxylic acids. According to one embodiment, the composition includes a $C_2$-$C_4$ peroxycarboxylic acid, a $C_8$-$C_{12}$ peroxycarboxylic acid, an ester peroxycarboxylic acid, an alkyl ester peroxycarboxylic acids, or a mono- or di-peroxycarboxylic acid having up to 12 carbon atoms, and more specifically 2 to 12 carbon atoms. In an embodiment, the peroxycarboxylic acid includes peroxyacetic acid (POAA) (i.e., peracetic acid having the formula $CH_3COOOH$) or peroxyoctanoic acid (POOA) (i.e., peroctanoic acid having the formula, e.g., of n-peroxyoctanoic acid: $CH_3(CH_2)_6COOOH$).

In an embodiment, the peracid is an ester peroxycarboxylic acid. As used herein, ester peroxycarboxylic acid refers to a molecule having the formula:

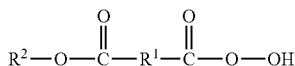

wherein $R^1$ and $R^2$ are independently an organic group (e.g., alkyl, linear or cyclic, aromatic or saturated) or a substituted organic group (e.g., with a heteroatom or organic group). In an embodiment, the ester peroxycarboxylic acid is made by employing methods used for making peroxycarboxylic acid such as combining the corresponding ester carboxylic acid with an oxidizing agent, e.g., hydrogen peroxide.

Exemplary alkyl esterperoxycarboxylic acids include monomethyl monoperoxyglutaric acid, monomethyl monoperoxyadipic acid, monomethyl monoperoxyoxalic acid, monomethyl monoperoxymalonic acid, monomethyl monoperoxysuccinic acid, monomethyl monoperoxypimelic acid, monomethyl monoperoxysuberic acid, monomethyl monoperoxysebacic acid; mono ethyl monoperoxyoxalic acid, monoethyl monoperoxymalonic acid, monoethyl monoperoxysuccinic acid, monoethyl monoperoxyglutaric acid, monoethyl monoperoxyadipic acid, monoethyl monoperoxypimelic acid, monoethyl monoperoxysuberic acid, monoethyl monoperoxysebacic acid; monopropyl monoperoxyoxalic acid, monopropyl monoperoxymalonic acid, monopropyl monoperoxysuccinic acid, monopropyl monoperoxyglutaric acid, monopropyl monoperoxyadipic acid, monopropyl monoperoxypimelic acid, monopropyl monoperoxysuberic acid, monopropyl monoperoxysebacic acid, in which propyl is n- or isopropyl; monobutyl monoperoxyoxalic acid, monobutyl monoperoxymalonic acid, monobutyl monoperoxysuccinic acid, monobutyl monoperoxyglutaric acid, monobutyl monoperoxyadipic acid, monobutyl monoperoxypimelic acid, monobutyl monoperoxysuberic acid, monobutyl monoperoxysebacic acid, in which butyl is n-, iso-, or t-butyl; and the like.

In some embodiments, the peracid breaker is a sulfoperoxycarboxylic acid. Sulfoperoxycarboxylic acids, which also are referred to as sulfonated peracids, include the peroxycarboxylic acid form of a sulfonated carboxylic acid. In some embodiments, the sulfonated peracid is a mid-chain sulfonated peracid, i.e., a peracid that includes a sulfonate group attached to a carbon that is at least one carbon (e.g., at least the three position) from the carbon of the percarboxylic acid group in the carbon backbone of the percarboxylic acid chain, wherein the at least one carbon is not in the terminal position. As used herein, the term "terminal position" refers to the carbon on the carbon backbone chain of a percarboxylic acid that is furthest from the percarboxyl group. Thus, in an embodiment, sulfoperoxycarboxylic acid has the following formula:

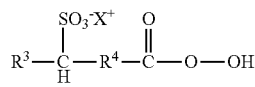

wherein $R^3$ is hydrogen or a substituted or unsubstituted alkyl group; $R^4$ is a substituted or unsubstituted alkyl group; X is hydrogen, a cationic group, or an ester forming moiety; or salts or esters thereof.

In some embodiments, $R^3$ is a substituted or unsubstituted $C_m$ alkyl group; X is hydrogen, a cationic group, or an ester forming moiety; $R^4$ is a substituted or unsubstituted C alkyl group; m=1 to 10; n=1 to 10; and m+n is less than 18; or salts, esters, or a combination thereof. In some embodiments, $R^3$ is hydrogen. In other embodiments, $R^3$ is a substituted or unsubstituted alkyl group. In some embodiments, $R^3$ is a substituted or unsubstituted alkyl group that does not include a cycloalkyl group. In some embodiments, $R^3$ is a substituted alkyl group. In some embodiments, $R^3$ is an unsubstituted $C_1$-$C_9$ alkyl group. In some embodiments, $R^3$ is an unsubstituted $C_7$ or $C_8$ alkyl. In other embodiments, $R^3$ is a substituted $C_8$-$C_{10}$ alkyl group. In some embodiments, $R^3$ is a substituted $C_8$-$C_{10}$ alkyl group and is substituted with at least 1, or at least 2 hydroxyl groups. In still yet other embodiments, $R^3$ is a substituted $C_1$-$C_9$ alkyl group. In some embodiments, $R^3_1$ is a substituted $C_1$-$C_9$ substituted alkyl group and is substituted with an —$SO_3H$ group. In other embodiments, $R^3$ is a $C_9$-$C_{10}$ substituted alkyl group. In some embodiments, $R^3$ is a substituted $C_9$-$C_{10}$ alkyl group wherein at least two of the carbons on the carbon backbone form a heterocyclic group. In some embodiments, the heterocyclic group is an epoxide group.

In an embodiment, $R^4$ is a substituted $C_1$-$C_{10}$ alkyl group. In some embodiments, $R^4$ is a substituted $C_8$-$C_{10}$ alkyl. In some embodiments, $R^4$ is an unsubstituted $C_6$-$C_9$ alkyl. In other embodiments, $R^4$ is a $C_8$-$C_{10}$ alkyl group substituted with at least one hydroxyl group. In some embodiments, $R^4$ is a $C_{10}$ alkyl group substituted with at least two hydroxyl groups. In other embodiments, $R^4$ is a $C_8$ alkyl group substituted with at least one —$SO_3H$ group. In some embodiments, $R^4$ is a substituted $C_9$ group, wherein at least two of the carbons on the carbon backbone form a heterocyclic group. In some embodiments, the heterocyclic group is an epoxide group. In some, embodiments, $R^4$ is a $C_8$-$C_9$ substituted or unsubstituted alkyl, and $R^4$ is a $C_7$-$C_8$ substituted or unsubstituted alkyl.

According to an embodiment, in a hydraulic fracturing fluid made by adding the additive to the treated water formed by subjecting the oilfield waste water to the biocide, the breaker is encapsulated in an encapsulating material to prevent the breaker from being dispersed and contacting other components of the treated water until a predetermined time such as after proppant placement or after fracturing has occurred. The encapsulating material is configured to release the breaker in response to a breaking condition, e.g., time, pressure, temperature, solvent contact, contact with an activator, and the like. The breaker is a solid or liquid. As a solid, the breaker is, e.g., a crystalline or granular material. In an embodiment, the solid is encapsulated or provided with a coating to delay its release or contact with other fracturing fluid components. Encapsulating materials are polymers or compounds that adhere well to molecules of the breaker. Methods of disposing the encapsulating material on the breaker are discussed in relation to the proppant. In an embodiment, a liquid breaker is dissolved in an aqueous solution or another suitable solvent.

In an embodiment, the encapsulation material is a polymer that releases the breaker in a controllable way, e.g., at a controlled rate or concentration. Such material is a polymer that degrades over a period of time to release the breaker and is chosen depending on the release rate desired. Degradation of the polymer of the encapsulation material polymer occurs, e.g., by hydrolysis, solvolysis, melting, and the like. In an embodiment, the polymer of the encapsulation material is a homopolymer or copolymer of glycolate and lactate, a polycarbonate, a polyanhydride, a polyorthoester, a polyphosphacene, or a combination thereof.

According to an embodiment, the encapsulated breaker is an encapsulated hydrogen peroxide, encapsulated metal peroxide (e.g., sodium peroxide, calcium peroxide, zinc peroxide, and the like), or a peracid or other breaker herein.

In an embodiment, the treated water also includes a fluid. The fluid is an aqueous liquid that includes water, brine, mineral acid, organic acid, or a combination comprising at least one of the foregoing. The brine is, for example, seawater, produced water, completion brine, or a combination thereof. The properties of the brine can depend on the identity and components of the brine. Seawater, as an example, contains numerous constituents such as bromine and trace metals, beyond typical halide-containing salts. In addition to the naturally occurring brines, completion brine is synthesized from fresh water by addition of various salts (e.g., KCl, NaCl, $ZnCl_2$, $MgCl_2$, or $CaCl_2$) to increase the density of the brine, such as 10.6 pounds per gallon of $CaCl_2$ brine. Completion brines typically provide a hydrostatic pressure optimized to counter the reservoir pressures downhole. In an embodiment, the above brines are modified to include an additional salt. In an embodiment, the additional salt included in the brine is NaCl, KCl, NaBr, $MgCl_2$, $CaCl_2$, $CaBr_2$, $ZnBr_2$, $NH_4Cl$, sodium formate, cesium formate, and the like. The salt is present in the brine in an amount from about 0.5 weight percent (wt %) to about 50 wt %, specifically about 1 wt % to about 40 wt %, and more specifically about 1 wt % to about 25 wt %, based on the weight of the fluid.

According to an embodiment, the fluid is a mineral acid that includes hydrochloric acid, nitric acid, phosphoric acid, sulfuric acid, boric acid, hydrofluoric acid, hydrobromic acid, perchloric acid, or a combination comprising at least one of the foregoing. In some embodiments, the fluid is an organic acid that includes a carboxylic acid, sulfonic acid, or a combination thereof. Exemplary carboxylic acids include formic acid, acetic acid, chloroacetic acid, dichloroacetic acid, trichloroacetic acid, trifluoroacetic acid, proprionic acid, butyric acid, oxalic acid, benzoic acid, phthalic acid (including ortho-, meta- and para-isomers), and the like. Exemplary sulfonic acids include alkyl sulfonic acid or aryl sulfonic acid. Alkyl sulfonic acids include, e.g., methane sulfonic acid. Aryl sulfonic acids include, e.g., benzene sulfonic acid or toluene sulfonic acid. In one embodiment, the alkyl group may be branched or unbranched and contains from one to about 20 carbon atoms and is substituted or unsubstituted. In an embodiment, the aryl group is alkyl-substituted, i.e., is an alkylaryl group, or is attached to the sulfonic acid moiety via an alkylene group (i.e., an arylalkyl group). In an embodiment, the aryl group is substituted with a heteroatom. The aryl group has from 3 carbon atoms to 20 carbon atoms and includes, e.g., a polycyclic ring structure.

Additionally, the additive is a proppant. The proppant is particles (also referred to as proppant particles) that include a ceramic, sand, a mineral, a nut shell, gravel, glass, resinous particles, polymeric particles, or a combination thereof. In an embodiment, the proppant particles are selected depending on the particular application of the treated water. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Badger sand, Brady sand, and Ottawa sand. In an embodiment, the proppant particles are made of a mineral such as bauxite and are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles include cured, partially cured, or uncured coatings of, e.g., a thermoset or thermoplastic resin. Curing the coating on the proppant particles occurs before or after disposal of the proppant particles in the treated water or before or after disposal of the treated water downhole, for example.

In an embodiment, the coating is an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof.

In an embodiment, the curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In an embodiment, the proppant particles include a crosslinked coating. The crosslinked coating typically provides crush strength, or resistance, for the proppant particles and prevents agglomeration of the proppant particles even under high pressure and temperature conditions. In some embodiments, the proppant particles have a curable coating, which cure subsurface, e.g. downhole or in a fracture. The curable coating cures under the high pressure and temperature conditions in the subsurface reservoir. Thus, the proppant particles having the curable coating are used for high pressure and temperature conditions.

According to an embodiment, the coating is disposed on the proppant particles by mixing in a vessel, e.g., a reactor. Individual components, e.g., the proppant particles and resin materials (e.g., reactive monomers used to form, e.g., an epoxy or polyamide coating) are combined in the vessel to form a reaction mixture and are agitated to mix the components. Further, the reaction mixture is heated at a temperature or at a pressure commensurate with forming the coating. In another embodiment, the coating is disposed on the particle via spraying such as by contacting the proppant particles with a spray of the coating material. The coated proppant particles are heated to induce crosslinking of the coating.

The aforementioned additive is added, e.g., to the treated water formed from the oilfield waste water. Here, a composition that is used to form the treated water includes the oilfield waste water treated with the biocide, the secondary biocide, the oxidizer, the coagulant, the flocculant, the additive, or a combination comprising at least one of the foregoing. An amount of each component is adjustable to achieve a selected amount of biocidal activity, e.g., 100% elimination of bacteria or less, during a selected time period or under select conditions.

Prior to introduction of the biocide, the number density of bacteria in the oilfield waste water is typically $10^6$ to $10^9$ bacterial cells per milliliter (bacterial/mL). After exposing the oilfield waste water to the biocide, the number density of the bacteria decreases by greater than or equal to 40%, specifically greater than or equal to 70%, more specifically greater than or equal to 85%, yet more specifically greater than or equal to 90%, even more specifically greater than or equal to 95%, further more specifically greater than or equal to 99%, and further even yet more specifically greater than or equal to 99.9%, based on the number of bacteria per milliliter of the oilfield waste water in units of bacteria/mL. In an embodiment, the biocide quantitatively reduces the bacteria in the oilfield waste water. That is, the biocide eliminates 100% of the bacteria in the oilfield waste water. It should be understood that the number density of bacteria in the oilfield waste water is designated as the number of viable bacteria cells in the oilfield waste water. Therefore, in determining the quantity of number density only living, even if dormant, bacteria are taken into account, such as by, e.g., measuring total adenosine triphosphate (ATP) content from these bacteria.

In this regard, the number density of the bacteria after treating the oilfield waste water with the biocide is less than or equal to $10^7$ bacterial/mL, specifically less than or equal to $10^6$ bacteria/mL, more specifically less than or equal to $10^5$ bacteria/mL, even more specifically less than or equal to $10^4$ bacteria/mL, yet more specifically less than or equal to $10^3$ bacteria/mL, and further more specifically less than or equal to $10^2$ bacteria/mL. It is contemplated that the number density of bacteria remaining in the treated water after combining the biocide with the oilfield waste water is tailorable to the specific application of the treated water post-treatment, such as a lower number density of bacteria for critical process (e.g., hydrocarbon production) or a higher number density of bacteria in less critical processes. According to an embodiment, criticality of a process with respect to the number density of bacteria in the treated water depends on an amount of nutrients that are present during the process.

The efficacy of the biocide depends on a number of parameters, including amount of the biocide present in the oilfield waste water, the number density of the bacteria, as well as other factors, including reproduction rate of the bacteria, temperature, and the like. The biocide is added to the oilfield in an amount from 0.5 parts per million (ppm) to 20,000 ppm, specifically from 1 ppm to 10,000 ppm, and more specifically from 1 ppm to 100 ppm, based on a volume of the oilfield waste water.

As an alternative to using ppm as a measure of the amount of the biocide in the oilfield waste water, a proxy for the amount of the biocide is used. In an embodiment, an oxidation reduction potential (ORP) of the oilfield waste water is determined. Without wishing to be bound by theory, it is recognized that ORP is a reliable indicator of the level of oxidation of the oilfield waste water. For reduced water, e.g., containing reduced metals (e.g., iron cations) or inorganic reducing agents (e.g., sulfide, bisulfide, and the like), the ORP is less than that for an oxidized water. In an embodiment, the ORP of the oilfield water is determined. Determining the ORP of the oilfield water is accomplished using e.g., an ORP meter that has been standardized relative to a known electrode potential. By convention, a standard hydrogen electrode (SHE) has a potential of 0 millivolt (mV), and a potential of a Ag/AgCl reference electrode is +230 mV relative to the SHE at 25° C. Here, ORP potentials are referenced to the Ag/AgCl potential; thus, ORP potentials have an offset of 230 mV relative to the SHE at 25° C.

Reduced oilfield waste water has an ORP of less than 150 mV, and bacteria are effectively oxidized at an ORP of 650 mV or greater. In an embodiment, the amount of the biocide present in the oilfield waste water is adjusted to an amount effective to decrease the number density of bacteria. In some embodiments, the amount of the biocide is adjusted such that the ORP of the oilfield waste water is greater than or equal to 600 mV, referenced to a Ag/AgCl reference electrode. Reaching an ORP value great enough for the biocide to reduce the number density of the bacteria in the oilfield water occurs after oxidation of material that otherwise interacts with the biocide via oxidation-reduction chemical reactions. Therefore, an organic material, an inorganic material, or a combination comprising at least one of the foregoing materials is oxidized prior to the biocide exhibiting biocidal bacteria reduction. The organic material is, e.g., a hydrocarbon, and the inorganic material is, e.g., a sulfide or a metal, including a metal cation such as ferrous or ferric cations. In an embodiment, the organic material or inorganic material present in the oilfield waste water is oxidized prior to combining the biocide and oilfield waste water. It is contemplated that the biocide comprising hydrogen peroxide has a biocidal effect after it reacts with other items (e.g., the inorganic or organic material) in the oilfield waste water. In an embodiment, the biocide is added in an amount that exceeds the amount of biocide that is used in redox reactions with the inorganic or organic material. Here, the amount of biocide is included in the oilfield waste water also to achieve a biocidal amount to reduce the number density of bacteria in the oilfield waste water.

In an embodiment, oxidizing the organic or inorganic material includes adding the oxidizer to the oilfield waste water prior to combining the biocide and the oilfield waste water. The oxidizer is the same or different as the biocide. The oxidizer is added to the oilfield in an amount effective to oxidize the organic and inorganic material so that these materials do not suppress the biocidal activity of the biocide with the bacteria. In an embodiment, the oxidizer is added to the oilfield waste water in an amount such that the ORP of the oilfield waste water is greater than or equal to 100 mV, specifically greater than or equal to 150 mV, more specifically greater than or equal to 300 mV even more specifically greater than or equal to 450 mV, referenced to an Ag/AgCl reference electrode. In some embodiments, the ORP value is from 100 mV to 800 mV upon adding the biocide.

According to an embodiment, the oilfield waste water is treated by measuring an oxidation reduction potential (ORP) of oilfield waste water and combining the oilfield waste water and an oxidizer. The oxidizer is added in an amount to adjust the ORP of the oilfield waste water to be greater than or equal to a first ORP value. The biocide comprising hydrogen peroxide is added to the oilfield waste water to adjust the ORP of the oilfield waste water to be greater than or equal to a second ORP value to treat the oilfield waste water. The second ORP value is greater than the first ORP value. In an embodiment, the oxidizer is different than the biocide. In one embodiment, the oxidizer is the same as the biocide. In some embodiments, a secondary biocide is combined with the oilfield waste water and the biocide. According to a particular embodiment, the oxidizer is a halogen oxidizer, an oxygen oxidizer, a peroxide, a nitrate, a nitrite, a dichromate, a nitrogen-chloro an oxidizer, or a combination comprising at least one of the foregoing.

The number density of the bacteria present in the oilfield waste water is determined before or after introduction of the biocide, the oxidizer, or a combination thereof. Determining the number density of the bacteria is accomplished in various manners. In an embodiment, the number density of the bacteria is determined by particle sizing such as by light scattering. In another embodiment, a small volume of oilfield water is disposed on an agar plate or slant tube and subjected to microbiological counting methods. Alternatively, the number density of the bacteria is determined by quantifying an amount of bacterial adenosine triphosphate (ATP) in a sample of the oilfield waste water, wherein the ATP is retrieved from living bacterial cells. The sample size is a portion or all of the oilfield waste water. In some embodiments, the sample is diluted, e.g., by serial dilution, to attain a suitable amount of bacteria in the sample.

The ATP quantification is accomplished by lysing the bacterial cells using an enzyme to release ATP into the sample of the oilfield waste water. An assay for the amount of ATP includes introducing a luminescent enzyme such as firefly luciferase to the sample and thereafter collecting luminescence from the luminescent enzyme. The luminescent data is optionally background corrected before normalization to a reference luminescent material. A kit for conducting ATP quantification is commercially available under the trade name Quench-Gone Aqueous Test Kit from LumiNUltra Technologies Ltd. It should be noted that the Quench-Gone Aqueous (QGA) test kit is compliant with ASTM Standard E4012 for ATP measurement. Thereafter, the number density of bacteria in the oilfield waste water is calculated from the amount of bacterial ATP.

Advantageously, the biocide comprising hydrogen peroxide treats oilfield waste water (e.g., produced water, flowback water, and the like) and produces non-toxic decomposition byproducts. The hydrogen peroxide when used as the sole biocide effectively reduces the number of bacteria in the oilfield waste water. The treated water is reused in oilfield applications. Apart from its antimicrobial properties, hydrogen peroxide also oxidizes inorganic material such as ferrous ions and organic compounds in the oilfield waste water to lower the amount of total dissolved solids (TDS). Beneficially, the hydrogen peroxide oxidizes sulfides, increasing the range of uses of the treated water and decreasing or eliminating sulfides such as hydrogen sulfide in the water.

The process herein has a number of uses including reuse of the treated water in numerous oilfield operations, disposal, storage, and the like. In an embodiment, a process for recycling oilfield waste water includes combining oilfield waste water and a biocide comprising hydrogen peroxide and decreasing a number density of bacteria in the oilfield waste water to form treated water. An additive is added to the treated water, and the treated water is disposed in a subterranean environment. Further, the oilfield waste water is contacted with an oxidizer prior to combining the oilfield waste water and the biocide. In an embodiment, after disposal of the treated water in the subterranean environment, the treated water is pressurized to fracture the subterranean environment. In some embodiments, the treated water is disposed in the subterranean environment for stimulated production of a well, hydraulic fracturing, enhanced oil recovery, and the like. The treated water containing the additive is, e.g., a hydraulic fracturing fluid comprising slickwater or a crosslink fluid; an enhanced oil recovery fluid; a completion fluid; a drilling fluid; or a combination comprising at least one of the foregoing. Exemplary treated water also includes drilling mud, completion fluid, workover fluid, packer fluid, stimulation fluid, conformance control fluid, permeability control fluid, consolidation fluid, and the like.

In an embodiment, combining the components of the treated water is accomplished in a vessel such as a mixer, blender, and the like. In some embodiments, the treated water is injected without mixing, e.g. it is injected "on the fly". The components are mixed, agitated, stirred, and the like. In an embodiment, the components are combined as the treated water is being disposed downhole. The treated water herein has advantageous properties that include suspending the proppant particles for an extended period of time or at an elevated temperature or pressure. In some embodiments, the treated water, with or without the additive is disposed in various environments other than subterranean. Other environments include a settling pond, a reserve pit, a disposal well, a tank, a tubular, a pipe, a pipeline, a Weir tank, a separator, a storage container, and the like.

Figure 2:
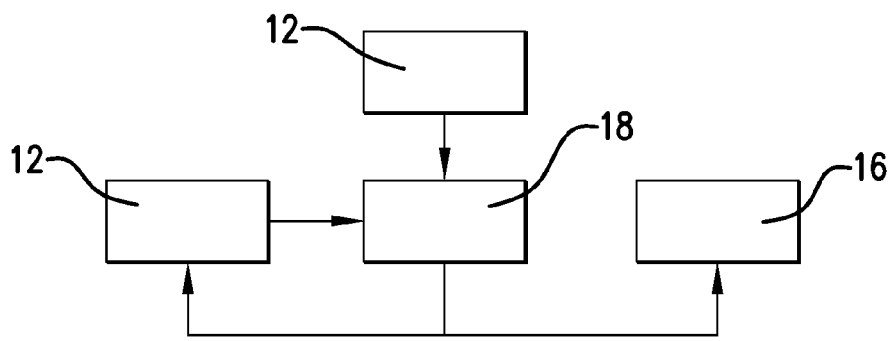
FIG. 2 shows a diagram of a dynamic treatment system for oilfield waste water.
Figure 3:
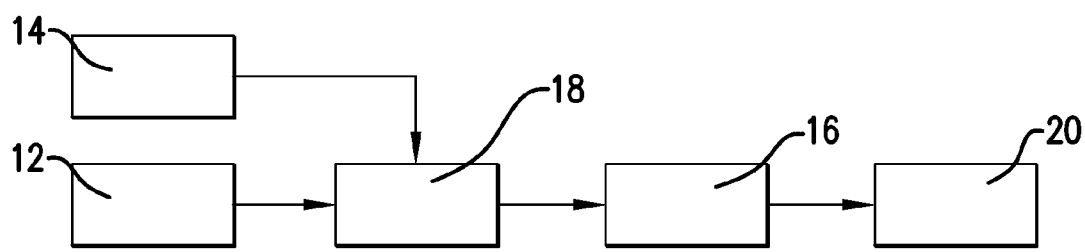
FIG. 3 shows a diagram of an on-the-fly treatment system for oilfield waste water.

The treatment of the oilfield waste water is applicable to many configurations. As shown in FIG. 1, the oilfield waste water can be treated in a batch treatment system 10. Here, the oilfield waste water issues from a source 12 into a treated water container 16 wherein the biocide from biocide source 14 also is disposed. The treated water container 16 includes active mixing (e.g., an agitator, mixing blade, and the like) or passive mixing (e.g., contoured surfaces) provisions to mix the biocide and the oilfield waster. In another embodiment, as shown in FIG. 2, in a dynamic mixing system 50, oilfield waste water from source 12 and biocide from biocide source 14 are mixed using an in-line mixer 18. The treated water then is returned to the source 12 or disposed in treated water container 16. In this configuration, the oilfield waste water from source 12 is subjected to one or more treatments of the biocide. In a further embodiment, as shown in FIG. 3, the oilfield waste water is treated in an on-the-fly treatment system 100 where oilfield waste water from source 12 and biocide from biocide source 14 are mixed using an in-line mixer 18 and subsequently placed in a treated water container 16. Thereafter, the treated water is transferred from the treated water container 16 and disposed in a subterranean environment 20. In treated water container 16, an additive is introduced into the treated water before disposal into the subterranean environment 20 in an embodiment. According to an embodiment, the oilfield waste water or treated water are subjected to filtration to remove particulates, including precipitates. The treated water container 16 is any of the environment included herein, e.g., a frac tank, above ground storage tank, oilfield pond, pit, and the like.

The process herein for biocidal treatment of oilfield waste water and formation of treated water is further illustrated by the following non-limiting example.

Example. Biocide Treatment of Oilfield Waste Water

Figure 4:
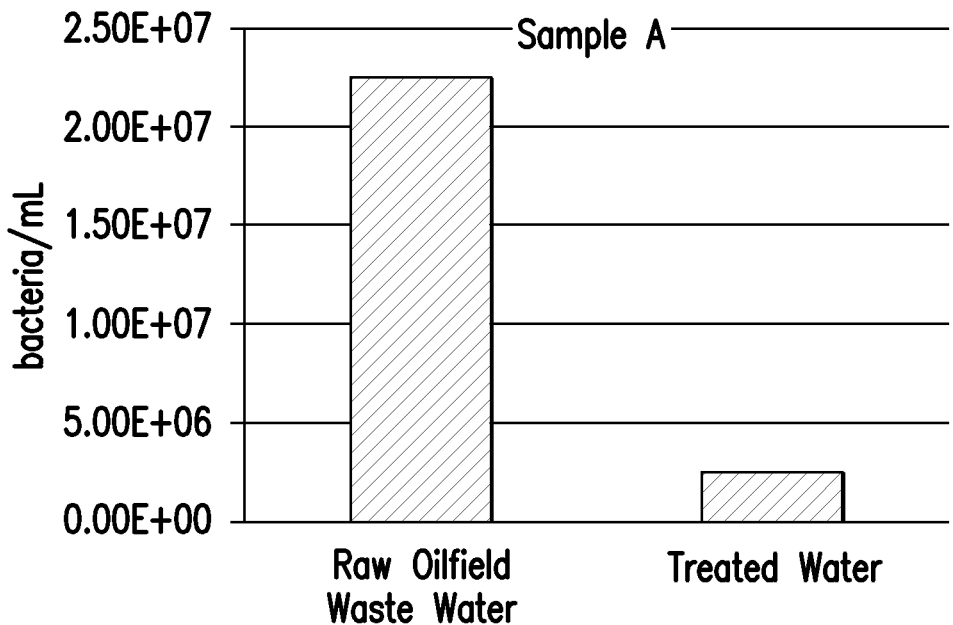
FIG. 4 shows a graph of number density of bacteria for raw oilfield waste water and oilfield waste water treated with a biocide.
Figure 5:
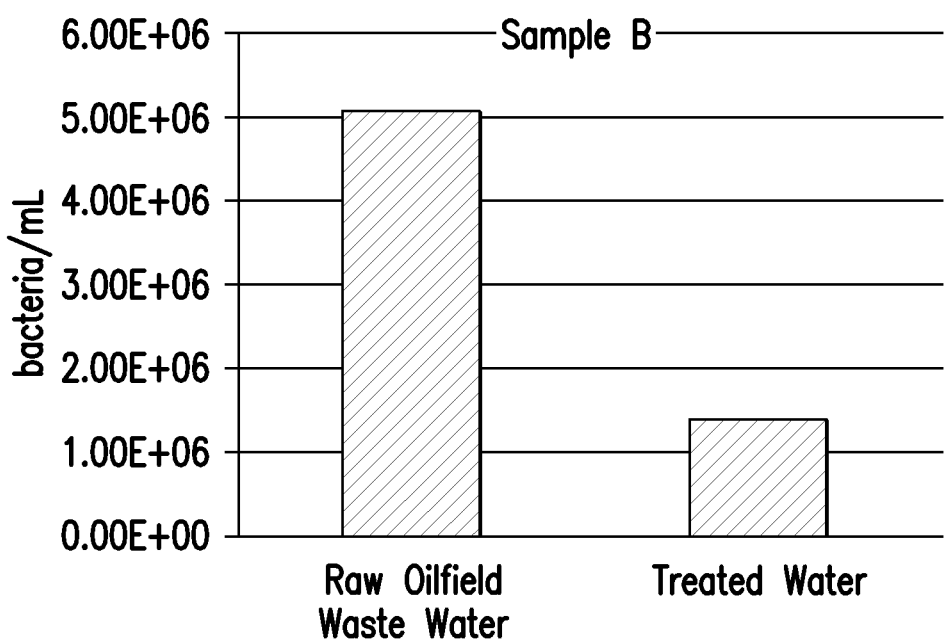
FIG. 5 shows a graph of number density of bacteria for raw oilfield waste water and oilfield waste water treated with a biocide.

Two samples (Sample A and Sample B) of raw oilfield waste water containing bacteria were acquired from different oil wells. Sample A and Sample B were treated by combining 10 mL of 30 vol % hydrogen peroxide to 250 mL of the respective oilfield waste water at room temperature. The samples were stirred. An aliquot of Sample A and Sample B was collected and subjected to ATP quantification before and after treatment with the hydrogen peroxide. Thereafter, the number density of the bacteria was determined for the raw oilfield waste water and the treated water for Sample A and Sample B. The results for each sample are shown in FIG. 4 (for Sample A) and FIG. 5 (for Sample B). As apparent from FIGS. 4 and 5, treatment of oilfield waste water with hydrogen peroxide drastically decreases the number density of bacteria in the treated water.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for treating oilfield waste water, the process comprising:

combining oilfield waste water comprising hydrogen sulfide and iron-oxidizing bacteria and a biocide consisting of hydrogen peroxide to form treated water, the biocide being present in an amount effective to decrease a number density of bacteria in the oilfield waste water; and reusing the treated water by disposing the treated water in a subterranean environment, wherein the process further comprises oxidizing an organic material, an inorganic material, or a combination comprising at least one of the foregoing materials with an oxidizer which is a nitrate, a nitrite, a dichromate, or a nitrogen-chloro oxidizer, or a combination comprising at least one of the foregoing, prior to combining the biocide and the oilfield waste water;

determining an oxidation reduction potential (ORP) of the oilfield waste water; and adjusting the amount of the biocide present in the oilfield waste water such that the ORP of the oilfield waste water is greater than or equal to 100 mV, referenced to a Ag/AgCl reference electrode.

2. The process of claim 1, wherein the oxidizer is added to the oilfield waste water in an amount such that an oxidation reduction potential (ORP) of the oilfield waste water is greater than or equal to 100 mV, referenced to an Ag/AgCl reference electrode.

3. The process of claim 1, further comprising determining the number density of the bacteria present in the oilfield waste water.

4. The process of claim 3, wherein, after combining the oilfield waste water and the biocide, the number density of the bacteria present in the oilfield waste water decreases by an amount greater than or equal to 90%, based on the number of bacteria per milliliter of the oilfield waste water.

5. The process of claim 3, wherein determining the number density of the bacteria comprises quantifying an amount of bacterial ATP in a sample of the oilfield waste water.

6. The process of claim 1, wherein the oilfield waste water comprises produced water, flowback water, pit water, or a combination comprising at least one of the foregoing.

7. The process of claim 1, wherein combining the biocide and the oilfield waste water occurs aboveground.

8. The method of claim 1, wherein the oilfield waste water is not treated with biocides or oxidants other than hydrogen peroxide.

9. The method of claim 1, further comprising heating the oilfield waste water.

10. A process for treating oilfield waste water, the process comprising:
   measuring an oxidation reduction potential (ORP) of oilfield waste water, the oilfield waste water comprising hydrogen sulfide and iron-oxidizing bacteria;
   combining the oilfield waste water and an oxidizer in an amount to adjust the ORP of the oilfield waste water to be greater than or equal to a first ORP value of 100 mV referenced to an Ag/AgCl reference electrode, the oxidizer comprising halogen oxidizer, nitrate, nitrite, dichromate, nitrogen-chloro oxidizer, or a combination comprising at least one of the foregoing; and
   adding a biocide comprising hydrogen peroxide to the oilfield waste water having an ORP of greater than or equal to 100 mV to adjust the ORP of the oilfield waste water to be greater than or equal to a second ORP value of 600 mV, referenced to an Ag/AgCl reference electrode, to treat the oilfield waste water, the second ORP value being greater than the first ORP value.

11. The process of claim 10, further comprising determining a number density of bacteria in the oilfield waste water.

12. The method of claim 10, wherein the biocide consists of hydrogen peroxide.

13. The method of claim 10, further comprising
   introducing an additive to the treated water; and
   disposing the treated water in a subterranean environment,
   wherein the additive comprises a coagulant, a flocculant, or a combination thereof;
   the coagulant comprises sodium chloride, aluminum sulfate, polyaluminum chloride, ferric sulfate, ferric chloride, aluminum chloride, sodium aluminate, polyethyleneimine, dimethylamine-epichlorohydrin copolymer, dicyandiamide-formaldehyde condensation product, cation-modified starch, tannin, a melamine formaldehyde, a resin amine, or a combination comprising at least one of the foregoing; and
   the flocculant comprises copolymer of acrylamide and acrylic acid, a copolymer of acrylamide and dimethylaminoethyl acrylate, N,N-dimethylaminoethyl acrylate methyl chloride quaternary, cationic polyacrylamide, acrylic acid, acrylamide meth acrylic acid, polyethylene imine or polyamine, a dicyandiamide condensation polymer, a polymer of water soluble ethylenically unsaturated monomer or monomer blend, or a combination comprising at least one of the foregoing.

14. A process for recycling oilfield waste water, the process comprising:
   combining oilfield waste water and a biocide consisting of hydrogen peroxide, the oilfield waste water comprising hydrogen sulfide and iron-oxidizing bacteria;
   decreasing a number density of bacteria in the oilfield waste water to form treated water;
   introducing an additive to the treated water; and
   disposing the treated water in a subterranean environment,
   wherein the additive comprises a coagulant, a flocculant, or a combination thereof;
   the coagulant comprises sodium chloride, aluminum sulfate, polyaluminum chloride, ferric sulfate, ferric chloride, aluminum chloride, sodium aluminate, polyethyleneimine, dimethylamine-epichlorohydrin copolymer, dicyandiamide-formaldehyde condensation product, cation-modified starch, tannin, a melamine formaldehyde, a resin amine, or a combination comprising at least one of the foregoing; and
   the flocculant comprises copolymer of acrylamide and acrylic acid, a copolymer of acrylamide and dimethylaminoethyl acrylate, N,N-dimethylaminoethyl acrylate methyl chloride quaternary, cationic polyacrylamide, acrylic acid, acrylamide meth acrylic acid, polyethylene imine or polyamine, a dicyandiamide condensation polymer, a polymer of water soluble ethylenically unsaturated monomer or monomer blend, or a combination comprising at least one of the foregoing, and
   the process further comprising oxidizing an organic material, an inorganic material, or a combination comprising at least one of the foregoing materials with an oxidizer which is a nitrate, a nitrite, a dichromate, or a nitrogen-chloro oxidizer, or a combination comprising at least one of the foregoing, prior to combining the biocide and the oilfield waste water.

15. The process of claim 14, further comprising contacting the oilfield waste water with an oxidizer prior to combining the oilfield waste water and the biocide.

16. The process of claim 14, further comprising pressurizing the treated water to fracture the subterranean environment.

17. The method of claim 14, wherein the recycled water is a hydraulic fracturing fluid comprising slickwater or a crosslink fluid; an enhanced oil recovery fluid; a completion fluid; a drilling fluid; or a combination comprising at least one of the foregoing.

* * * * *